(12) United States Patent
Jones et al.

(10) Patent No.: US 8,799,447 B2
(45) Date of Patent: Aug. 5, 2014

(54) NOTARIZING PACKET TRACES

(75) Inventors: Daniel Horacio Jones, Round Rock, TX (US); Thomas Girard Lendacky, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2422 days.

(21) Appl. No.: 11/550,462

(22) Filed: Oct. 18, 2006

(65) Prior Publication Data

US 2008/0098107 A1 Apr. 24, 2008

(51) Int. Cl.
*G06F 15/173* (2006.01)
(52) U.S. Cl.
USPC ........... 709/224; 709/221; 709/222; 709/225; 709/227; 709/228; 709/229; 709/237
(58) Field of Classification Search
None
See application file for complete search history.

(56) References Cited

U.S. PATENT DOCUMENTS

| | | | | |
|---|---|---|---|---|
| 5,978,475 | A * | 11/1999 | Schneier et al. | 713/177 |
| 6,874,089 | B2 * | 3/2005 | Dick et al. | 726/14 |
| 7,272,606 | B2 * | 9/2007 | Borthakur et al. | 707/769 |
| 7,328,349 | B2 * | 2/2008 | Milliken | 713/181 |
| 7,373,509 | B2 * | 5/2008 | Aissi et al. | 713/168 |
| 7,594,009 | B2 * | 9/2009 | Triulzi et al. | 709/224 |
| 7,743,415 | B2 * | 6/2010 | Poletto et al. | 726/23 |
| 7,761,919 | B2 * | 7/2010 | Gassoway | 726/24 |
| 7,913,086 | B2 * | 3/2011 | Kostiainen et al. | 713/176 |
| 8,037,318 | B2 * | 10/2011 | Tahan | 713/189 |
| 2004/0117478 | A1 * | 6/2004 | Triulzi et al. | 709/224 |
| 2009/0307487 | A1 * | 12/2009 | Movva et al. | 713/156 |

OTHER PUBLICATIONS

Trusted Computing: Providing Security for Peer-to-Peer Networks; Balfe et al, IEEE 2005.*
Secure Data Management in Trusted Computing; Kuhn et al, CHES 2005.*
Satchel, "Keeping e-mail secure" Oct. 2000, pp. 1-5, retrieved Sep. 13, 2006. http://www6.software.ibm.com/software/developer/library/s-email.pdf.
"Cyveillance: Online Risk Monitoring and management", retrieved Sep. 13, 2006 http://www.cyveillance.com.
"Electronic Records as Evidence", Public Record Office Victoria, May 2003, Version 1, retrieved Sep. 13, 2006. http://www.prov.vic.gov.au/publications/publns/PROVRMadvice8.pdf.
Schneier on Security: VOIP Encryption, retrieved Sep. 13, 2006. http://www.prov.vic.gov.au/publications/publns/PROVRMadvice8.pdf.
Hudson, "Re: Audit Logs as submissible evidence", retrieved Sep. 8, 2006. http://lists.jammed.com/forensics/2002/0610047.html.

* cited by examiner

*Primary Examiner* — Rupal Dharia
*Assistant Examiner* — Van Kim T Nguyen
(74) *Attorney, Agent, or Firm* — Yee & Associates, P.C.; Parashos Kalaitzis (57) ABSTRACT

A system and method for capturing non-forgeable packet traces. Upon start-up of a sniffer, a first quote of Platform Configuration Register (PCR) values in a Trusted Platform Module (TPM) utilized by the sniffer is obtained, wherein the first quote comprises a list of starting values in the PCRs and is signed by the TPM and stored in a packet log. When a packet of interest is intercepted by the sniffer, the sniffer obtains a hash of the packet and instructs the TPM to extend a PCR with the hash value. The packet of interest is then stored in the packet log. When the sniffer is shutdown, a second quote of values in the PCRs is obtained, wherein the second quote comprises a list of current values in the PCRs, and wherein the second quote is signed by the TPM and stored in the packet log.

27 Claims, 7 Drawing Sheets

-----BEGIN QUOTE-----
PCR-00: 36 D4 12 E9 5F B2 E2 F0 42 23 4D 9C AD 56 3D B4 51 4B 2F 2F
PCR-01: 2B 5E EF 9B 37 CA 6F DC BE 39 9B 78 69 F0 4D B4 97 99 CB D2
PCR-02: CD 18 59 ED BB 0F 68 C8 38 B3 E4 0A 96 F5 C2 10 88 58 31 1A
PCR-03: 04 FD EC DD 50 1D AF 0F 62 4C 1F 99 60 12 CF 30 44 FF 46 10
PCR-04: A1 45 AB 75 62 A3 4E 03 7E E4 10 72 59 CD DD 9A 58 A1 0A F1
PCR-05: 04 FD EC DD 50 1D AF 0F 62 4C 1F 99 60 12 CF 30 44 FF 46 10
PCR-06: 04 FD EC DD 50 1D AF 0F 62 4C 1F 99 60 12 CF 30 44 FF 46 10
PCR-07: 04 FD EC DD 50 1D AF 0F 62 4C 1F 99 60 12 CF 30 44 FF 46 10
PCR-08: 00 00 00 00 00 00 00 00 00 00 00 00 00 00 00 00 00 00 00 00
PCR-09: 00 00 00 00 00 00 00 00 00 00 00 00 00 00 00 00 00 00 00 00
PCR-10: 00 00 00 00 00 00 00 00 00 00 00 00 00 00 00 00 00 00 00 00
PCR-11: 00 00 00 00 00 00 00 00 00 00 00 00 00 00 00 00 00 00 00 00
PCR-12: 00 00 00 00 00 00 00 00 00 00 00 00 00 00 00 00 00 00 00 00
PCR-13: 00 00 00 00 00 00 00 00 00 00 00 00 00 00 00 00 00 00 00 00
PCR-14: 00 00 00 00 00 00 00 00 00 00 00 00 00 00 00 00 00 00 00 00
PCR-15: 00 00 00 00 00 00 00 00 00 00 00 00 00 00 00 00 00 00 00 00 owGt1D1rVTEcx/FrWxfFoavTd1DBQiHP5+Qgah5HEcfi1HZXFMTFUdFFpOAihe6C
s4NvQRDEzVfQi4M4OZrcXt+AHsgQkn8+/18y5M2IzcXG9o8r7Fx7//vruQ9be/tb
Dw8ePS68/nQ33dsVYkl7skEqisdWYpsoqsAoIMZkfCJkrENnosFKTETVPi6sEDmh
IrZQKj6iB1LAVXIiFrTvi8OI8yt2hfgB70mRrNalmkgZOWI9pdVERMWNpBE9EjXF
IALeUS1JIQVjK267EhnWiJ4QhpopidwyC2Qm1BWIMAlZe18n+n1TRbc8rb5iXAfP
EDMR2h0tocW2/WBo71AQmqH0GK1yUD1nC9y6+NBjtCMtXpVrxM6RxM2BDHMgY0PE
v48zxM+ASDEHIudA1ByIngMxcyD2P5GXtzbPL/rH8ve72d6QYXF88Q7ff11+t3/j
5/XnJ/d3bj97+uLj4uTQLJenN69+e3t4tDw6+PzkwZdXe38A
=ml4h
-----END QUOTE-----
0.000000 192.168.0.2 -> 192.168.0.255 CUPS ipp://192.168.0.2:631/printers/HL_5140_series (idle)
30.860735 192.168.0.2 -> 192.168.0.255 CUPS ipp://192.168.0.2:631/printers/HL_5140_series (idle)
31.712865 AsustekC_80:42:2c -> Broadcast ARP Who has 192.168.0.1? Tell 192.168.0.5

TO FIG. 7B

FIG. 7B  FROM FIG. 7A  700

```
-----BEGIN QUOTE-----
PCR-00: 36 D4 12 E9 5F B2 E2 F0 42 23 4D 9C AD 56 3D B4 51 4B 2F 2F
PCR-01: 2B 5E EF 9B 37 CA 6F DC BE 39 9B 78 69 F0 4D B4 97 99 CB D2
PCR-02: CD 18 59 ED BB 0F 68 C8 38 B3 E4 0A 96 F5 C2 10 88 58 31 1A
PCR-03: 04 FD EC DD 50 1D AF 0F 62 4C 1F 99 60 12 CF 30 44 FF 46 10
PCR-04: A1 45 AB 75 62 A3 4E 03 7E E4 10 72 59 CD DD 9A 58 A1 0A F1
PCR-05: 04 FD EC DD 50 1D AF 0F 62 4C 1F 99 60 12 CF 30 44 FF 46 10
PCR-06: 04 FD EC DD 50 1D AF 0F 62 4C 1F 99 60 12 CF 30 44 FF 46 10
PCR-07: 04 FD EC DD 50 1D AF 0F 62 4C 1F 99 60 12 CF 30 44 FF 46 10
PCR-08: 00 00 00 00 00 00 00 00 00 00 00 00 00 00 00 00 00 00 00 00
PCR-09: 00 00 00 00 00 00 00 00 00 00 00 00 00 00 00 00 00 00 00 00
PCR-10: 00 00 00 00 00 00 00 00 00 00 00 00 00 00 00 00 00 00 00 00
PCR-11: 00 00 00 00 00 00 00 00 00 00 00 00 00 00 00 00 00 00 00 00
PCR-12: 00 00 00 00 00 00 00 00 00 00 00 00 00 00 00 00 00 00 00 00
PCR-13: 00 00 00 00 00 00 00 00 00 00 00 00 00 00 00 00 00 00 00 00
PCR-14: AE CE B2 E5 01 EF 16 73 17 4B F2 F9 44 D4 BD 40 60 DB 8F 8B
PCR-15: 00 00 00 00 00 00 00 00 00 00 00 00 00 00 00 00 00 00 00 00 owGtlDuLFTEcR+8+bASLBbETzoJY7CLkPZNpZPKqFzuXrbRV8PEdVLBQK7FQe8FG
WLCxt9hiuY2g30CsFoQtTeZev4AOpBiSf05OJvnI5aWtxebOr2vsXf9wvtz4uH37
zvaDu48eZ17tHcRbN4QYOI5kklrssYVQPxRFYBRKYxI+MiasQyeCwUpMQJXWLk4Q
OaACNpMLPqA74ogrpEjlaN86ux7nJ+wE8R3eEwNJrSFqICZkj/XkWhMQBdcTe3RP
0GSDGPOYokKKehrcR2VyHEN0QPCUBI5kqqzQCbGMqEUJiJLW9eJtt9Y0NWn1heM
a8AVxAyMdY+WsWrbNnGs/yEjNF1uGrWyU82zCtdV/Ng06pSqV+QaYucwcXNAujkg
fYWlf28riJ8BIsUcEDkHRM0B0XNA2o3NxDyF1yJkS6J0dBrZtbSWmmjfjrUmPSSM
aMedAn2hDyuG/U+RZze3Lizau/L3tdnZPHq9eH//WH46fLq8+nn35/GP07Mnv79u
vFi8U+fLL/u7z698f3hZv7X7J/nem29/AA==
=20g7
-----END QUOTE-----
```

NOTARIZING PACKET TRACES

BACKGROUND OF THE INVENTION

1. Field of the Invention

The present invention relates generally to wiretapping electronic communications, and in particular to a computer implemented method, data processing system, and computer program product for authenticating or "notarizing" packet traces.

2. Description of the Related Art

Wiretapping is the process of monitoring telephone or electronic communications by third party, often by covert means. This process of intercepting telephone conversations and electronic communications such as faxes, email, and other data transfers provides an effective investigation tool to be used by law enforcement agencies. To implement a wiretap, law enforcement agencies typically issue a wiretap request to the central office of the telephone companies or Internet Service Providers (ISPs). Examples of wiretapping products employed by law enforcement agencies to intercept electronic communications include Carnivore, which was developed by the U.S. Federal Bureau of Investigation, and Cyveillance, a commercial product. The Carnivore system is deployed at the ISP of the person for whom the law enforcement officials have wiretap authorization to snoop and store their communication traces. Both Cyveillance and Carnivore operate essentially as packet sniffers, which are programs that can "see" all of the information passing over a network to which it is connected. The program looks at, or "sniffs", each packet as the data streams over the network. The wiretap devices look for packets or communication sessions with particular packet attributes and if found, save the sessions to disk or tape for later viewing and use in court proceedings. However, if the chain of custody of generated computer records such as these stored sessions cannot be proven, a court may consider such records as hearsay, and special arguments must be made to be able to introduce the records as evidence in court.

Existing methods in the current art for storing information related to a wiretap include hashing audit log records, using a hardware device to store the message digests of audit log records, integrating message digests into particular applications such as chat clients, and using a hardware device to store the message digests of a chat log. However, all of these existing methods typically store the wiretap information within a log and then perform a hash of the entire log. A hash function substitutes or transposes the data to create a digital "fingerprint", or a hash value. A typical hash function comprises a short string of letters and numbers (binary data written in hexadecimal notation). When another hash value of the log is taken at a later time, the two hash values are compared. If the hash values match, the log is determined to be authentic. However, there may still be some question as to the authenticity of the data in a court of law since the computer data may potentially be altered prior to the initial hash of the complete log. There is currently no way to ensure that the data has not been altered or touched by someone in some way since the time it was collected.

SUMMARY OF THE INVENTION

The illustrative embodiments provide a computer implemented method, data processing system, and computer program product for authenticating or "notarizing" packet traces. In particular, the illustrative embodiments provide a network sniffer for capturing non-forgeable packet traces. Responsive to a start-up of the sniffer, a first quote of values is obtained from one or more platform configuration registers in a trusted platform module utilized by the sniffer, wherein the first quote comprises a list of starting values in the platform configuration registers, and wherein the first quote is signed by the trusted platform module and stored in a packet log. When a packet of interest is intercepted at the sniffer, the sniffer obtains a hash of the packet of interest. The sniffer then instructs the trusted platform module to extend a platform configuration register with the hash of the packet of interest by appending the hash of the packet of interest to the hash of the current value of the platform configuration register and hashing this value to create the new hash which is stored in the PCR. The sniffer may instruct the trusted platform module to extend the platform configuration register by calling a PCR-Extend API. The packet of interest is then stored in the packet log. When the sniffer is shutdown, a second quote of values in the platform configuration registers is obtained, wherein the second quote comprises a list of current values in the platform configuration registers, and wherein the second quote is signed by the trusted platform module and stored in the packet log.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A and 7B depict an example log file in accordance with the illustrative embodiments;

DETAILED DESCRIPTION OF THE PREFERRED EMBODIMENT

Figure 1:
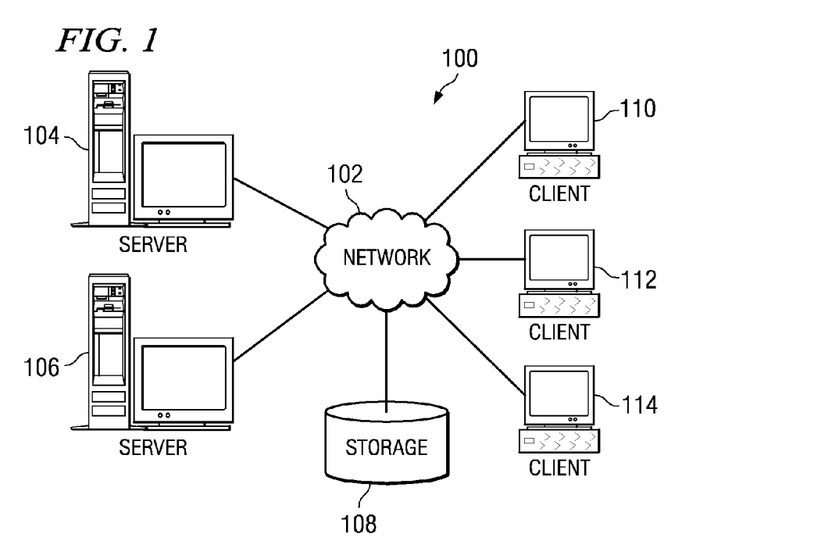
FIG. 1 depicts a pictorial representation of a distributed data processing system in which the illustrative embodiments may be implemented.
Figure 2:
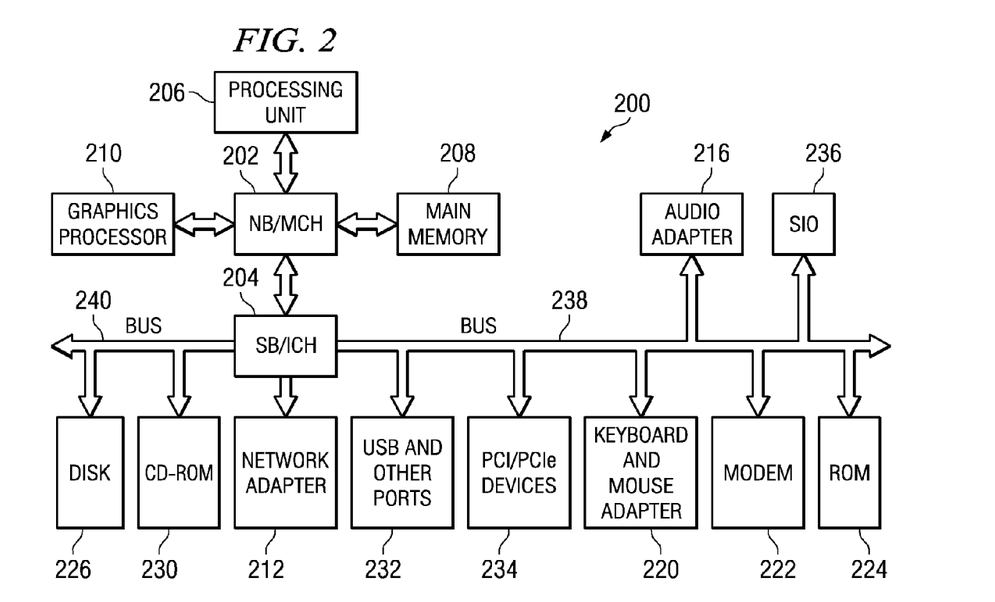
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In situations where computer records are routinely and automatically generated, the current standard required for showing chain-of-custody for computer records in a court of law is for a forensics collector to generate hash values for the computer records and show that the records shown in court have the same hash value as the collected records. However, the reliability and believability of current chain-of-custody evidence is based on the credibility of the forensics collector, since the records and the hashes may be tampered with by anyone who touches the records both during collection and after collection but before they are presented in court. Thus, the hashes may be validated only by assertion that everyone in the chain of custody acted honorably.

The illustrative embodiments address the problems in the current art by providing a computer implemented method, data processing system, and computer program product for authenticating or "notarizing" wiretaps of electronic communications. In particular, the illustrative embodiments enable network sniffers to apply a validation to computer records at the point of record collection, thereby allowing one to verify the authenticity of the packet traces for court proceedings. A sniffer is a program which monitors and captures data being transmitted on a network. With the illustrative embodiments, the reliability of the records may be increased by utilizing a hardware device, such as a Trusted Platform Module (TPM), in conjunction with a network sniffer to provide the capability of "notarizing" wiretaps. The hashing of the computer records in the illustrative embodiments is performed at record collection time, thereby allowing one to compare, at a later date, a running hash against the stored hash to verify that the records are authentic. In addition, as the hash values are stored in the TPM, the values cannot be tampered without subverting the hardware. For instance, when a quote is taken, the quote is signed with the TPM key, and the signing key never leaves the TPM. If the quote is altered, the signature will not validate the new (altered) quote.

A TPM is a microcontroller affixed to the motherboard of a PC which stores keys, passwords, and digital certificates and performs all cryptographic functions on the chip. Alternatively, the TPM may be implemented in software. The TPM validates the stored data packets in the wiretap using integrity measurements which require a root of trust within the computing platform. In order to determine the integrity of the stored data packets, a hardware or firmware component, called the Trusted Building Block (TBB) component, takes integrity measurements at the initial boot process of the sniffer to create the Core Root of Trust for Measurement (CRTM). The CRTM is the basis of the chain of trust. All software that is executed on the sniffer is then measured and becomes part of the chain of trust. The TBB component provides trusted measurement functions (e.g. Secure Hash Algorithm-1 (SHA-1)) to the rest of the platform. A packet measurement is a hash of the complete packet, including packet headers and payload. These measurements are stored in the TPM. The hashes are stored in protected registers called Platform Configuration Registers (PCRs). For example, when a packet is received at the sniffer, the sniffer measures the entire packet. The sniffer then extends a particular PCR. The TPM extends the PCR by appending the hash value taken from the packet to the current hash value of the PCR. The extended value is then rehashed to form a composite hash value for the PCR. These extended PCR values obtained at the time of packet collection may then be used to validate the authenticity of the stored packets in the packet log.

The sniffer is located at some point in the communications path between the sender and the receiver. The sniffer comprises wiretap software that is used to determine which packets traveling on the network match interest criteria and should be retained. The interest criteria used by the sniffer to determine which packets traveling on the network should be captured may include, but is not limited to, source or destination Internet Protocol addresses of the packets, keywords or phrases within the packet, as well as other packet attributes. The sniffer must have a TPM implementation and may operate either on the network with its network interface in promiscuous mode, or the sniffer may serve as the router or bridge.

During sniffer start-up time, a quote (measurement) of the initial PCR values signed by the key stored in the TPM is taken by the sniffer. This initial quote is the starting PCR values hashed together to form a composite initial PCR value. For example, the initial value of a PCR is normally either "0000000000000000000000000000000000000000" or "FFFFFFFFFFFFFFFFFFFFFFFFFFFFFFFFFFFFFFFF". Alternatively, if the PCR was previously extended, an example value may comprise "ea1a3901c085941efde6f198f4b62e2fc2a6ea94". The initial quote is signed by the TPM to allow one to verify through a digital signature that the content of the packet log is accurate and has not been tampered with. As packets arrive at the sniffer, the sniffer identifies packets which match the interest criteria. If the sniffer makes a determination that a packet should be stored, the packet may be measured by the sniffer individually, or the sniffer may group packets of interest together for speed and measurement. The measurement is stored by extending a PCR with the hash value. Intermediary quotes may be taken of the PCR values. In this manner, a PCR may be extended as many times as necessary while maintaining the packet log. When the sniffer is shut down, a final quote is taken of the PCR values, which comprises the values hashed together to form a composite final PCR value. The final quote contains the measurement of the entire packet log.

When the packets are to be used as evidence in a court proceeding, the packets may be authenticated by re-running the packet log and validating that the resulting final PCR values match those from the final quote. If the calculated PCR value does not match the final quote value, then either the packet log or the quote has been tampered with since the time of collection. If the log has been tampered with, the packet log cannot be introduced as evidence in a court of law.

Figure 3:
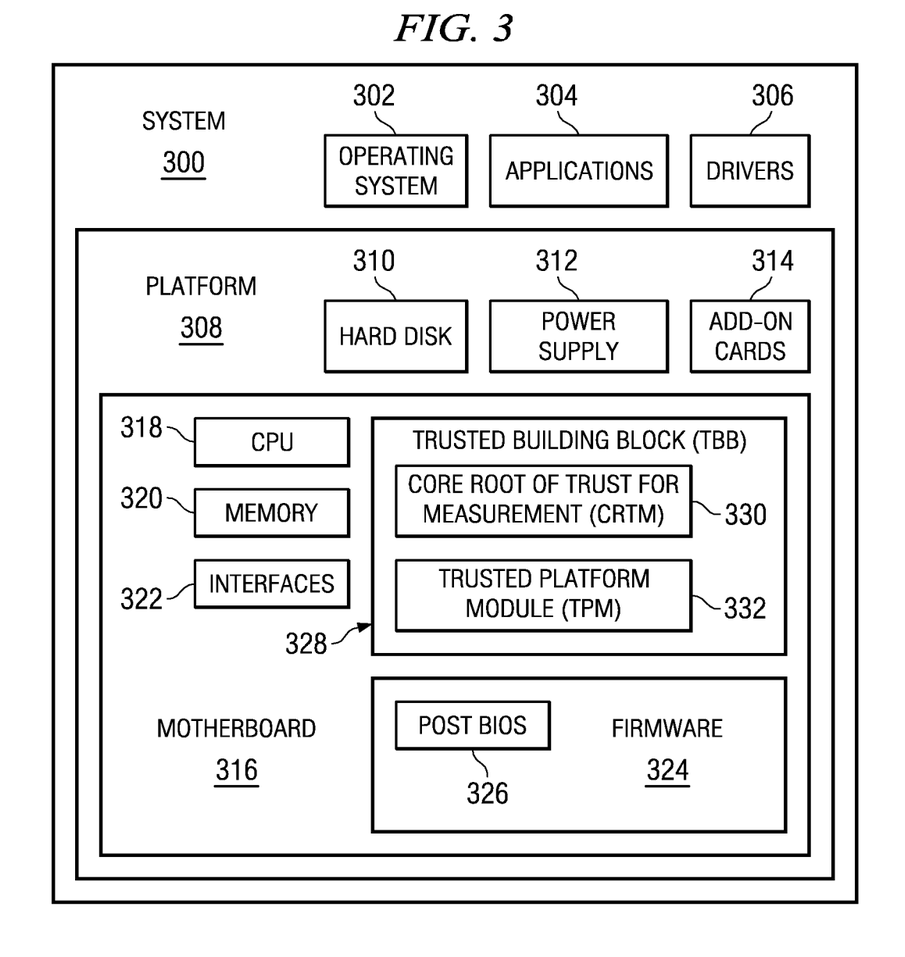
FIG. 3 is a block diagram of an exemplary trusted platform architecture in which the illustrative embodiments may be implemented.

With reference now to FIG. 3, a block diagram of an exemplary trusted platform architecture with which the illustrative embodiments may be implemented is shown. FIG. 3 depicts a trusted platform architecture in accordance with the Trusted Computing Group's (TCG) PC-specific implementation specification. It should be clear to one skilled in the art that the sniffer may alternatively be based on a server, virtual, mobile phone or similar platform.

System 300 supports execution of software components, such as operating system 302, applications 304, and drivers 306, on its platform 308. The software components may be received through a network, such as network 102 shown in FIG. 1, or may be stored, for example, on hard disk 310. Platform 308 receives electrical power from power supply 312 for executing the software components on add-on cards 314 and motherboard 316, which includes typical components for executing software, such as CPU 318 and memory 320, although motherboard 316 may include multiple CPUs. Interfaces 322 connect motherboard 316 to other hardware components within system 300, and firmware 324 contains POST BIOS (power-on self-test basic input/output system) 326.

Motherboard 316 also comprises trusted building block (TBB) 328. Motherboard 316 is supplied by a manufacturer with TBB 328 and other components physically or logically attached and supplied by the manufacturer. TBB 328 comprises the combination of CRTM 330, TPM 332, the connection of CRTM 330 to motherboard 316, and the connection of the TPM 332 to motherboard 316. CRTM 330 is an immutable portion of the platform's initialization code that executes upon a platform reset event.

Figure 4:
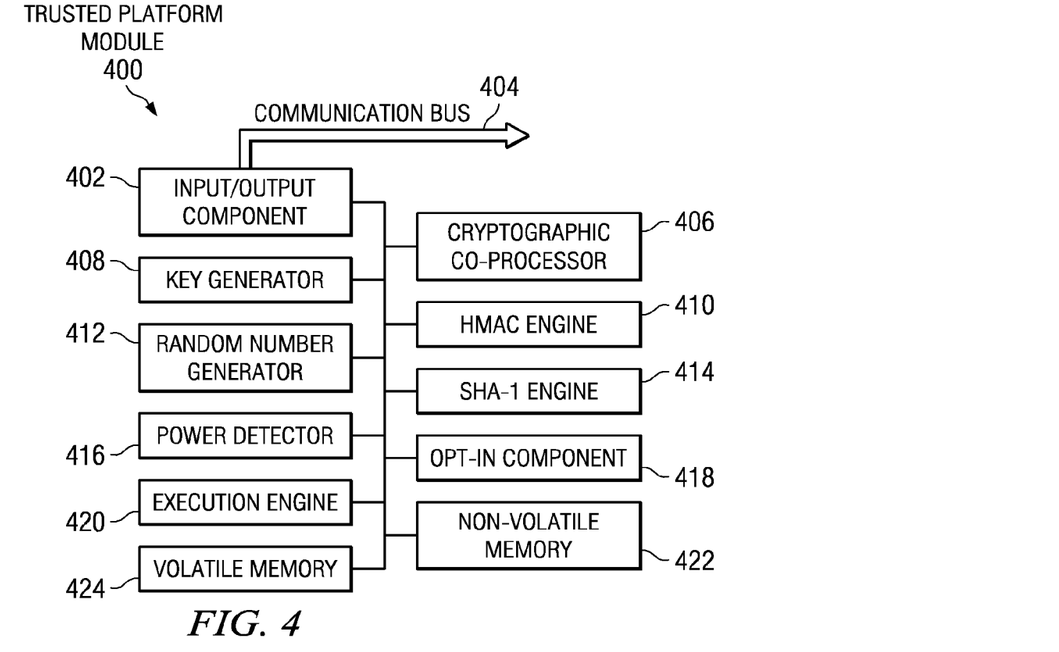
FIG. 4 is a block diagram illustrating an exemplary trusted platform architecture with which the illustrative embodiments may be implemented.

Turning now to FIG. 4, a block diagram of an exemplary trusted platform module is shown. FIG. 4 illustrates components of a trusted platform module, such as TPM 332 in FIG. 3, according to TCG specifications. As previously mentioned, TPM 400 is used in conjunction with a network sniffer to provide the capability of notarizing wiretaps.

TPM 400 comprises input/output component 402, which manages information flow over communications bus 404 by performing appropriate protocol encoding/decoding operations and routing of messages to appropriate components. TPM 400 contains cryptographic processing capabilities. TPM 400 may also be implemented on a cryptographic co-processor 406, such as PCI-X Cryptographic Coprocessor (PCIXCC). Key generator 408 creates symmetric keys and RSA asymmetric cryptographic key pairs. HMAC engine 410 performs HMAC (Keyed-Hashing for Message Authentication) calculations, whereby message authentication codes are computed using secret keys as integrity checks to validate information.

Random number generator 412 acts as a source of randomness for the computation of various values, such as keys or other values. SHA-1 engine 414 implements the SHA-1 hash algorithm. Power detector 416 manages the power states of TPM 400 in association with the power states of the platform. Opt-in component 418 maintains the state of persistent and volatile flags and enforces semantics associated with those flags such that TPM 400 may be enabled and disabled. Execution engine 420 runs program code to execute commands that TPM 400 receives through input/output component 402. Non-volatile memory 422 stores persistent identity and state associated with TPM 400. Non-volatile memory 422 may store static data items but is also available for storing dynamic data items by entities that are authorized by the TPM owner. Volatile memory 424 stores dynamic data items, including the Platform Configuration Registers, which are extended with the measurements of the packets of interest.

Figure 5A:
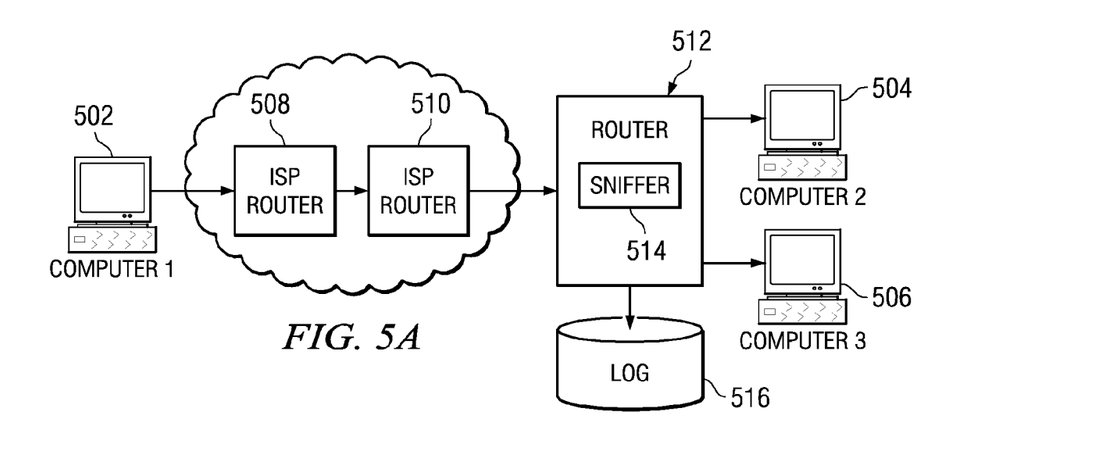
FIGS. 5A and 5B are block diagrams of known wiretapping configurations.
Figure 5B:
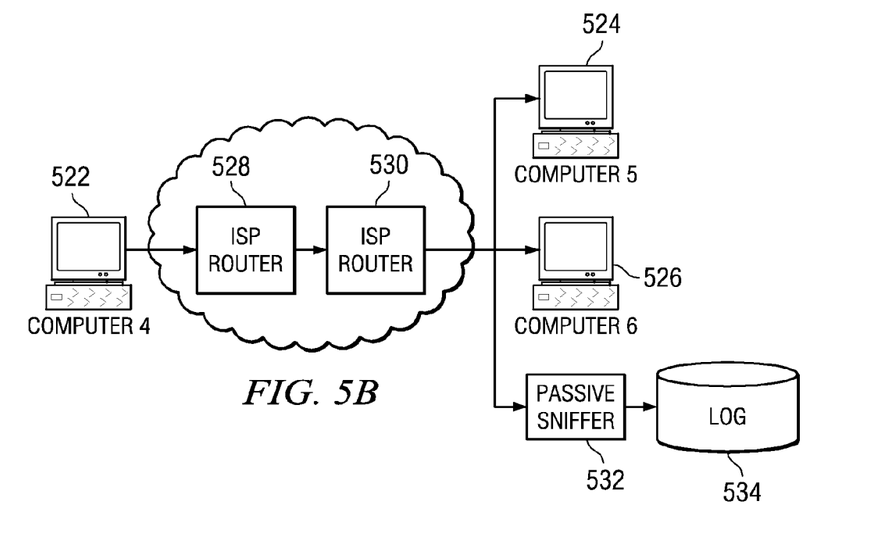

FIGS. 5A and 5B are block diagrams of known wiretapping configurations. In particular, FIG. 5A shows several computers linked together in a network. Computer 1 502, computer 2 504, and computer 3 506 are examples of data processing systems such as clients 110-114 in FIG. 1 connected by a network, such as network 102. In this illustrative example, a data packet may be transmitted from computer 1 502 to computer 2 504 or computer 3 506 via Internet Service Provider (ISP) routers 508 and 510. However, router 512 containing a sniffer (sniffer 514) is placed between computers 1 502, 2 504, and 3 506. As the packet travels through router 512, sniffer 514 captures all packets destined for computers 2 504 or 3 506 and examines the packet headers and/or content. Sniffer 514 is an "active" sniffer in that the sniffer receives packets intended for destination computers 2 504 and 3 506 and sends the packet to the destination computer after the packet header is analyzed. If a captured packet contains something of interest to the sniffer, the sniffer will first store the packet of interest in log 516 and then forward the packet to its intended destination computer, such as computers 2 504 or 3 506.

Similar to FIG. 5A, FIG. 5B shows several computers, computer 4 522, computer 5 524, and computer 6 526, connected in a network. A data packet may be transmitted from computer 4 522 to computer 5 524 or computer 6 526 via ISP routers 528 and 530. In the configuration in FIG. 5B, however, the sniffer being used on the network is not located within a router as in FIG. 5A, but rather sniffer 532 is a "passive" sniffer and is located on the same network segment as one of the targeted computers or one of the routers along the path to the target computers. A passive sniffer does not directly intrude onto a foreign network or computer, and the activity of a passive sniffer is not detectable by the devices being observed. While computers 5 524 and 6 526 will accept only those packets from ISP router 530 which have packet header information indicating that the packet is intended for that particular computer, sniffer 532 accepts all packets and examines the packet headers and/or content. If a captured packet contains something of interest to sniffer 532, the sniffer will store the packet of interest in log 534.

Figure 6:
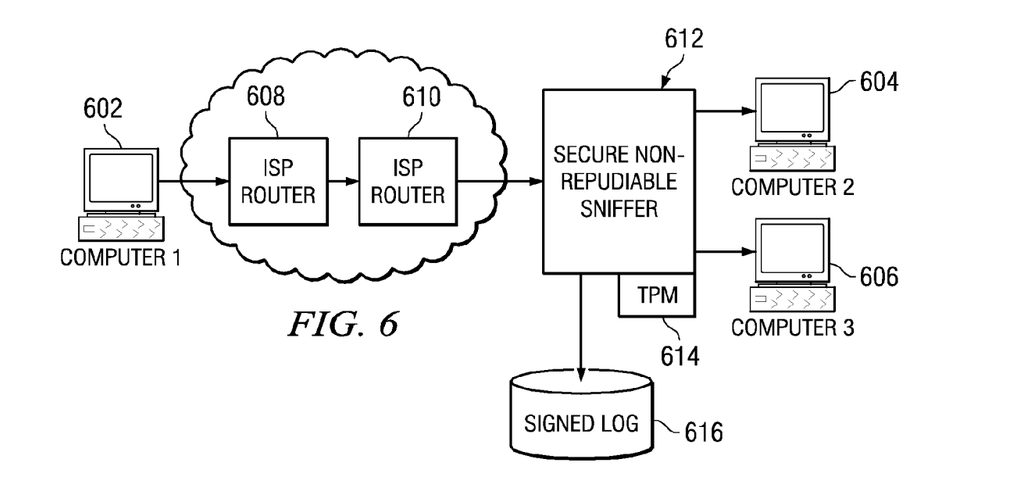
FIG. 6 is a block diagram of an exemplary wiretapping configuration comprising a secure non-repudiable sniffer in accordance with the illustrative embodiments.

FIG. 6 is a block diagram of an exemplary wiretapping configuration comprising a secure non-repudiable sniffer in accordance with the illustrative embodiments. The wiretapping configuration in FIG. 6 allows for intercepting and authenticating packet traces while the packet is transmitted from the source to the destination location, in contrast with the wiretapping configurations in FIGS. 5A and 5B which may authenticate the packet traces after the packets are stored. The drawback to the configurations in FIGS. 5A and 5B is that they leave a long window of vulnerability during which time the packet traces may have been undetectably altered. In addition, the authentication provided by the wiretapping configuration in FIG. 6 also allows for determining the router software and hardware which collected the packet trace.

In this illustrative example, a data packet may be transmitted from computer 1 602 to computer 2 604 or computer 3 606 via ISP routers 608 and 610. All packets transmitted between computer 1 602 and computers 2 604 and 3 606 are intercepted by sniffer 612. Sniffer 612 is a secure non-repudiable sniffer in that sniffer 612 allows packet trace measurements to be taken when the packets are collected, thereby increasing the reliability of the computer records for evidence purposes. It should be noted that although sniffer 612 is an active sniffer in the particular wiretapping configuration in FIG. 6, the sniffer may also be implemented as a passive sniffer without departing from the spirit or scope of the illustrative embodiments.

TPM 614 is an example of a trusted platform module, such as TPM 400 in FIG. 4. TPM 614 is connected to sniffer 612 and used to store and authenticate the trust measurements of the packets intercepted by sniffer 612. Sniffer 612 may be placed at any point in the communications path between computer 1 602 and computer 2 604 or computer 3 606. As a packet travels from computer 1 602 to computer 2 604, sniffer 612 captures the packet and examines the packet header and/or content. If the captured packet contains something of interest to sniffer 612, the sniffer will store the packet information of interest in signed log 616 and then send the packet to its intended destination computer, such as computers 2 604 or 3 606 without knowledge or consent of the computer owners. In contrast with log 516 in FIG. 5A and log 534 in FIG. 5B, log 616 contains the initial quote, the intermediary quotes, and the final quotes which form the basis for the strong authentication of the log.

FIGS. 7A and 7B depict an example log file in accordance with the illustrative embodiments. In particular, log file 700 represents a log file, such as log 616 in FIG. 6. However, for purposes of illustration, log file 700 has been rendered human readable, and thus does not represent the actual contents of the log file in the preferred embodiment.

Figure 8:
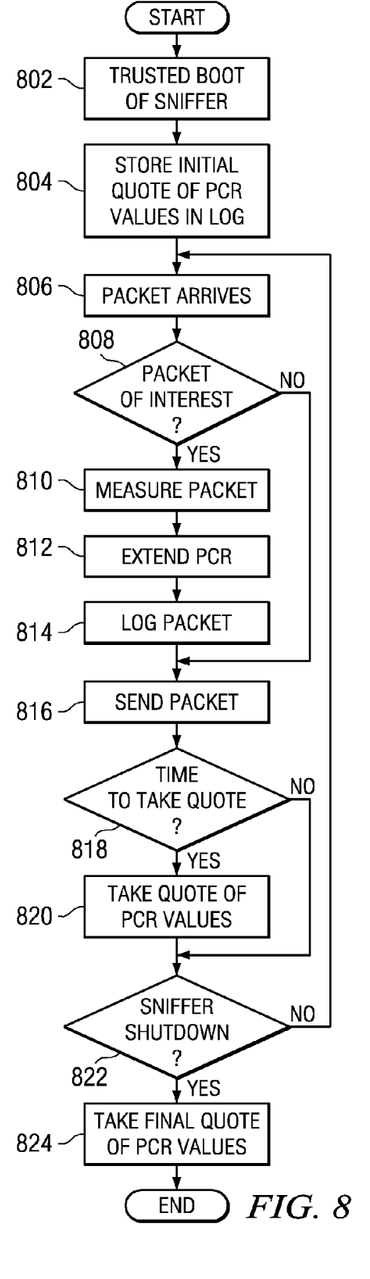
FIG. 8 is a flowchart illustrating the sniffer logic in accordance with the illustrative embodiments.

FIG. 8 is a flowchart illustrating the sniffer logic in accordance with the illustrative embodiments. The process begins with a trusted boot of the sniffer (step 802). In the trusted boot, the sniffer instructs the TPM to take an initial quote of the PCRs which comprises a hash of the starting values of the PCRs. The initial quote is then signed by the TPM and provided to the packet log (step 804). When a packet arrives at the sniffer (step 806), the sniffer determines whether the packet is a packet of interest (step 808). This determination may be made based on a set of interest criteria such as, for example, packet header information (e.g., IP source or destination address) or the content of the packet itself.

If the sniffer determines the packet is of interest ('yes' output of step 808), the sniffer then measures the packet by taking a hash of the entire packet (step 810). This hashed value measurement is then stored in a PCR by extending the current PCR value with the hashed value of the packet (step 812). The packet of interest is then stored in the packet log (step 814). The packet is then sent to its intended destination computer (step 816).

Turning back to step 808, if the sniffer determines that the packet is not of interest ('no' output of step 808), the sniffer skips to step 816 and sends the packet to its intended destination.

The sniffer then makes a determination as to whether an intermediary quote should be taken of the stored packets (step 818). Intermediary quotes of the stored packets may be taken periodically and appended to the packet log. If the sniffer determines that an intermediary quote should not be taken ('no' output of step 818), the process continues to step 822. However, if the sniffer determines that an intermediary quote should be taken ('yes' output of step 818), the sniffer instructs the TPM to take a quote of the PCR values and stores that quote in the packet log (step 820). A determination is then made as to whether the sniffer has been shut down (step 822). If the sniffer is not shut down ('no' output of step 822), the process loops back to step 806 and the sniffer waits for another packet to arrive. If the sniffer is shut down ('yes' output of step 822), then a final quote is taken (step 824), with the process terminating thereafter. The final quote of the stored packets may be appended to the packet log.

Figure 9:
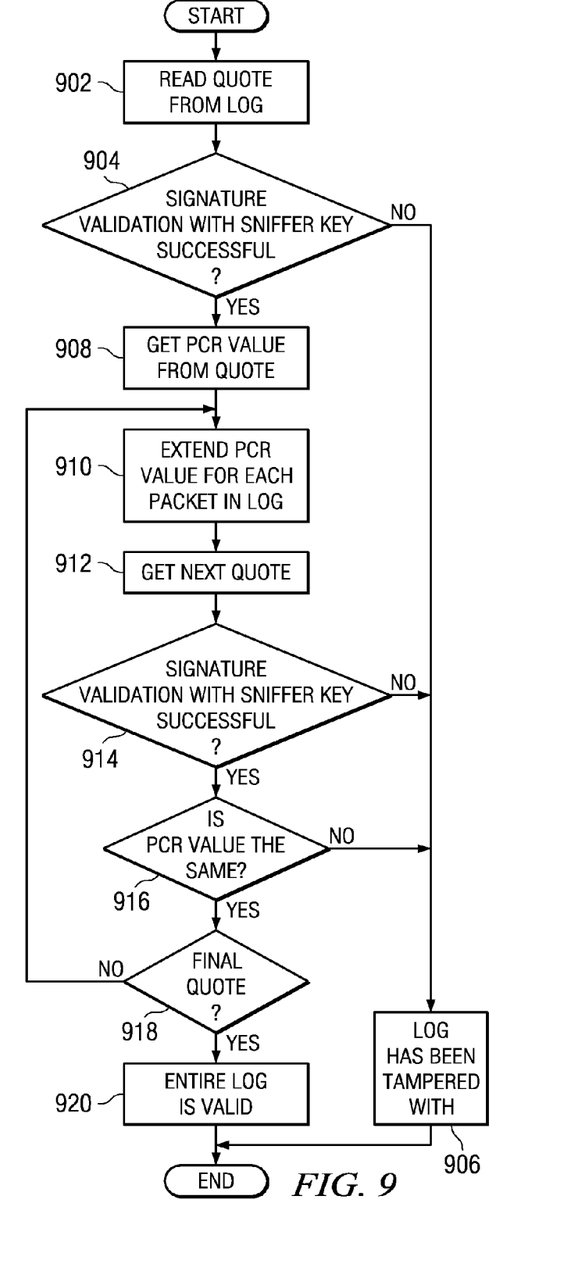
FIG. 9 is a flowchart illustrating the process of validating the proof of log correctness in accordance with the illustrative embodiments.

FIG. 9 is a flowchart illustrating the process of validating the proof of log correctness in accordance with the illustrative embodiments. The process in FIG. 9 may be implemented in the sniffer or may be a standalone process.

The process begins with the validator reading a first quote in the log (step 902). The validator verifies the signature of the quote using the sniffer TPM key to determine if the signature is valid (step 904) via standard digital signature technique. If the signature does not validate using the sniffer TPM key ('no' output of step 904), the validator determines that the log has been tampered with (step 906), and the process terminates thereafter.

If the signature validates using the sniffer key ('yes' output of step 904), the validator obtains the PCR values from the quote read from the log (step 908). The PCR values from the quote are then extended for each packet in the log (step 910). Subsequently, the next quote in the log is read by the TPM (step 912). The validator compares the signature of the next quote against the sniffer TPM key to determine if the signature is valid (step 914). If the signature does not validate using the sniffer key ('no' output of step 914), the TPM determines that the log has been tampered with (step 906), and the process terminates thereafter.

If the signature validates using the sniffer TPM key ('yes' output of step 914), a determination is made as to whether the PCR values of the first quote after having been extended with the each packet in the log up to the next quote is the same as the PCR values of the next quote (step 916). If the PCR values are different ('no' output of step 916), the validator determines that the log has been tampered with (step 906), and the process terminates thereafter.

If the PCR values are the same ('yes' output of step 916), then a determination is made as to whether the quote is the final quote in the log (step 918). If the quote is not the final quote ('no' output of step 918), the process loops back to step 910 where the PCR values are calculated for each packet in the log up to the next quote. If the quote is the final quote in the log ('yes' output of step 918), the validator determines that the entire log is valid (step 920), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method implemented by a computer for capturing non-forgeable packet traces, the method comprising:
the computer, responsive to a start-up of a sniffer, obtaining a first quote of values in one or more platform configuration registers in a trusted platform module utilized by the sniffer, wherein the first quote comprises a list of starting values in the one or more platform configuration registers, and wherein the first quote is signed by the trusted platform module and stored in a packet log;

the computer, responsive to intercepting a packet of interest at the sniffer, obtaining a hash of the packet of interest;

the computer instructing the trusted platform module to extend a platform configuration register with the hash of the packet of interest by appending the hash of the packet of interest with the hash of the current value of the platform configuration register; the extended value then rehashed to form a composite hash value for the platform configuration register;

the computer storing the packet of interest in the packet log; and the computer, responsive to a shutdown of the sniffer, obtaining a second quote of values in the platform configuration registers, wherein the second quote comprises a list of current values in the platform configuration registers, and wherein the second quote is signed by the trusted platform module and stored in the packet log.

2. The computer implemented method of claim 1, further comprising:

calculating anticipated platform configuration register values in the second quote based on the first quote and the packet log;

comparing the anticipated platform configuration register values in the second quote with extended platform configuration register values in the second quote; and if the comparison results in a match, determining that the packets of interest stored in the packet log are authentic.

3. The computer implemented method of claim 2, wherein the calculating step is performed separately from collection of entries in the packet log or on a different computer.

4. The computer implemented method of claim 1, further comprising:

calculating anticipated platform configuration register values in the second quote based on the first quote and the packet log;

comparing the anticipated platform configuration register values in the second quote with actual platform configuration register values in the second quote; and if the comparison does not result in a match, determining that the packets of interest stored in the packet log are not authentic.

5. The computer implemented method of claim 1, further comprising:

obtaining one or more intermediary quotes of the platform configuration registers in the trusted platform module, wherein each intermediary quote is obtained during packet collection, wherein each intermediary quote comprises a list of the current value of at least one platform configuration register, and wherein each intermediary quote is signed by the trusted platform module; and storing each intermediary quote in the packet log.

6. The computer implemented method of claim 1, wherein the sniffer determines a packet is a packet of interest based on one or more attributes of the packet.

7. The computer implemented method of claim 6, wherein the attributes include at least one of an Internet Protocol source address, Internet Protocol destination address, protocol, port, time, size, or keywords in the packet.

8. The computer implemented method of claim 1, wherein the sniffer is one of an active or passive sniffer.

9. The computer implemented method of claim 1, wherein the sniffer is positioned at any point in a communications path between a sender of the packet of interest and a receiver of the packet of interest.

10. A data processing system for capturing non-forgeable packet traces, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to obtain a first quote of values in one or more platform configuration registers in a trusted platform module utilized by a sniffer in response to a start-up of the sniffer, wherein the first quote comprises a list of starting values in the one or more platform configuration registers, and wherein the first quote is signed by the trusted platform module and stored in a packet log, obtain a hash of a packet of interest in response to intercepting the packet of interest at the sniffer, instruct the trusted platform module to extend a platform configuration register with the hash of the packet of interest by appending the hash of the packet of interest with the hash of the current value of the platform configuration register, the extended value then rehashed to form a composite hash value for the platform configuration register, store the packet of interest in the packet log, and obtain a second quote of values in the platform configuration registers in response to a shutdown of the sniffer, wherein the second quote comprises a list of current values in the platform configuration registers, and wherein the second quote is signed by the trusted platform module and stored in the packet log.

11. The data processing system of claim 10, wherein the processing unit further executes the computer usable code to calculate anticipated platform configuration register values in the second quote based on the first quote and the packet log, compare the anticipated platform configuration register values in the second quote with extended platform configuration register values in the second quote, and determine that the packets of interest stored in the packet log are authentic if the comparison results in a match.

12. The data processing system of claim 11, wherein the calculation of anticipated platform configuration register values in the second quote based on the first quote and the packet log is performed separately from collection of entries in the packet log or on a different computer.

13. The data processing system of claim 10, wherein the processing unit further executes the computer usable code to calculate anticipated platform configuration register values in the second quote based on the first quote and the packet log, compare the anticipated platform configuration register values in the second quote with actual platform configuration register values in the second quote, and determine that the packets of interest stored in the packet log are not authentic if the comparison does not result in a match.

14. The data processing system of claim 10, wherein the processing unit further executes the computer usable code to obtain one or more intermediary quotes of the platform configuration registers in the trusted platform module, wherein each intermediary quote is obtained during packet collection, wherein each intermediary quote comprises a list of the current value of at least one platform configuration register, and wherein each intermediary quote is signed by the trusted platform module, and store each intermediary quote in the packet log.

15. The data processing system of claim 10, wherein the sniffer determines a packet is a packet of interest based on one or more attributes of the packet.

16. The data processing system of claim 15, wherein the attributes include at least one of an Internet Protocol source address, Internet Protocol destination address, protocol, port, time, size, or keywords in the packet.

17. The data processing system of claim 10, wherein the sniffer is one of an active or passive sniffer.

18. The data processing system of claim 10, wherein the sniffer is positioned at any point in a communications path between a sender of the packet of interest and a receiver of the packet of interest.

19. A computer program product for capturing non-forgeable packet traces, the computer program product comprising:
 a non-transitory computer usable storage medium having computer usable program code tangibly stored thereon, the computer usable program code comprising:
 computer usable program code for obtaining a first quote of values in one or more platform configuration registers in a trusted platform module utilized by a sniffer in response to a start-up of the sniffer, wherein the first quote comprises a list of starting values in the one or more platform configuration registers, and wherein the first quote is signed by the trusted platform module and stored in a packet log;
 computer usable program code for obtaining a hash of a packet of interest in response to intercepting the packet of interest at the sniffer;
 computer usable program code for instructing the trusted platform module to extend a platform configuration register with the hash of the packet of interest by appending the hash of the packet of interest with the hash of the current value of the platform configuration register, the extended value then rehashed to form a composite hash value for the platform configuration register; and
 computer usable program code for storing the packet of interest in the packet log; and
 computer usable program code for obtaining a second quote of values in the platform configuration registers in response to a shutdown of the sniffer, wherein the second quote comprises a list of current values in the platform configuration registers, and wherein the second quote is signed by the trusted platform module and stored in the packet log.

20. The computer program product of claim 19, further comprising:
 computer usable program code for calculating anticipated platform configuration register values in the second quote based on the first quote and the packet log;
 computer usable program code for comparing the anticipated platform configuration register values in the second quote with extended platform configuration register values in the second quote; and
 computer usable program code for determining that the packets of interest stored in the packet log are authentic if the comparison results in a match.

21. The computer program product of claim 20, wherein the calculation of anticipated platform configuration register values in the second quote based on the first quote and the packet log is performed separately from collection of entries in the packet log or on a different computer.

22. The computer program product of claim 19, further comprising:
 computer usable program code for calculating anticipated platform configuration register values in the second quote based on the first quote and the packet log;
 computer usable program code for comparing the anticipated platform configuration register values in the second quote with actual platform configuration register values in the second quote; and
 computer usable program code for determining that the packets of interest stored in the packet log are not authentic if the comparison does not result in a match.

23. The computer program product of claim 19, further comprising:
 computer usable program code for obtaining one or more intermediary quotes of the platform configuration registers in the trusted platform module, wherein each intermediary quote is obtained during packet collection, wherein each intermediary quote comprises a list of the current value of at least one platform configuration register, and wherein each intermediary quote is signed by the trusted platform module; and
 computer usable program code for storing each intermediary quote in the packet log.

24. The computer program product of claim 19, wherein the sniffer determines a packet is a packet of interest based on one or more attributes of the packet.

25. The computer program product of claim 24, wherein the attributes include at least one of an Internet Protocol source address, Internet Protocol destination address, protocol, port, time, size, or keywords in the packet.

26. The computer program product of claim 19, wherein the sniffer is one of an active or passive sniffer.

27. The computer program product of claim 19, wherein the sniffer is positioned at any point in a communications path between a sender of the packet of interest and a receiver of the packet of interest.

\* \* \* \* \*